United States Patent
Ku et al.

(10) Patent No.: US 8,946,933 B2
(45) Date of Patent: Feb. 3, 2015

(54) POWER MANAGEMENT APPARATUS AND METHOD OF OPERATING THE SAME

(75) Inventors: Chen-Wei Ku, Taoyuan County (TW); Lei-Ming Lee, Taoyuan County (TW); Ho Huang, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 549 days.

(21) Appl. No.: 13/401,106

(22) Filed: Feb. 21, 2012

(65) Prior Publication Data

US 2013/0147274 A1 Jun. 13, 2013

(30) Foreign Application Priority Data

Dec. 9, 2011 (TW) .............................. 100145495 A

(51) Int. Cl.
*H02J 1/00* (2006.01)
*H02J 3/00* (2006.01)

(52) U.S. Cl.
CPC .... *H02J 1/00* (2013.01); *H02J 3/00* (2013.01)
USPC .................................. 307/85; 307/44; 307/45

(58) Field of Classification Search
CPC ............... H02J 1/00; H02J 3/00; H02J 3/005; H02J 2001/004
USPC ............................................... 307/85, 45, 44
See application file for complete search history.

(56) References Cited

U.S. PATENT DOCUMENTS

| 7,979,166 B2 * | 7/2011 | Yamada et al. ............... 700/291 |
| 2005/0012395 A1 * | 1/2005 | Eckroad et al. ................ 307/44 |
| 2013/0049695 A1 | 2/2013 | Baba et al. |

FOREIGN PATENT DOCUMENTS

| EP | 1742321 | 1/2007 |
| JP | 2002152976 | 5/2002 |
| JP | 2004012376 | 1/2004 |
| WO | WO 2011141798 | 11/2011 |

* cited by examiner

*Primary Examiner* — Hal Kaplan
(74) *Attorney, Agent, or Firm* — Muncy, Geissler, Olds & Lowe, P.C.

(57) ABSTRACT

A power management apparatus and a method of operating the same are disclosed. The power management apparatus includes a power conversion unit, a first sensing unit, a second sensing unit, a switch unit, and a control unit. The power conversion unit converts output power generated from at least one renewable energy generation apparatus. The first sensing unit is provided to sense a first current and a first voltage and the second sensing unit is provided to sense a second current and a second voltage. The control unit acquires an output power generated from the renewable energy generation apparatus and acquires a feedback power to an AC utility according to the currents and the voltages when the control unit turns on the switch unit.

20 Claims, 6 Drawing Sheets

POWER MANAGEMENT APPARATUS AND METHOD OF OPERATING THE SAME

BACKGROUND OF THE INVENTION

1. Field of the Invention

The present invention relates generally to a power management apparatus and a method of operating the same, and more particularly to a power management apparatus of a renewable energy generation and a method of operating the same.

2. Description of Prior Art

The development of technologies and economic activities causes rapid energy consumption on the earth so that hidden energy crisis seems to exist. Hence, it is important to save energy as well as develop energy, more particular to the renewable energy. The renewable energy can be used to achieve self-sufficient power supply and further the redundant part thereof can be fed back to the power system to sell power demand back to the power companies.

Take the solar photovoltaic generation system as an example, the solar photovoltaic system provides a photovoltaic conversion to generate a DC power through the solar cell panels. Afterward, the DC power is converted into an AC power through a power conditioner to supply to a load or to the utility grid bus which is grid-connected to an AC utility power. The solar photovoltaic system can be broadly divided into three categories: (1) stand-alone system, (2) grid-connection system, and (3) hybrid system.

The stand-alone system means that the solar photovoltaic system is completely operational without requiring external support and only directly supply to a load. Hence, the stand-alone system is generally built in remote areas or isolated islands. In particular, the required power electricity of a load is either the wind power or the solar power. The solar power or/and the wind power can further provide redundant power to charge the standby battery, whereas the load can be supplied through the battery when the solar power or/and the wind power is insufficient. The grid-connection system means that the solar photovoltaic system is further connected to the power grid of the electric power company. Hence, the grid-connection system is suitable for where the utility power can reach. When the amount of electricity generation of the solar photovoltaic system is greater than that of load demands, the redundant power remains would be delivered to the utility grid bus. On the other hand, the utility power can provide the required power electricity to a load when the amount of electricity generation of the solar photovoltaic system is insufficient. Furthermore, in order to improve the power supply reliability and quality, the hybrid system is developed. The solar photovoltaic system, which is combined with standby batteries, is temporarily separated from the utility power to provide power electricity to a load when the utility power fails. The solar photovoltaic system is further grid-connected to the utility grid bus and charge the standby battery until the utility power is available.

Reference is made to FIG. 1 which is a schematic diagram of a prior art renewable energy generation system. In this generation system structure, electricity generation is determined according to a maximum output power of the renewable energy apparatuses, instead of use conditions of loads, for dispatching power. Hence, it is possible to increase difficulty of the power dispatching and even harm to the system reliability. In addition, it is unable to protect loads once the electrical power system occurs abnormal operation.

Accordingly, it is desirable to provide a power management apparatus and a method of operating the same so that it is to switch the renewable energy generation apparatus in a grid-connection operation or a stand-alone operation by providing an additional switch unit. In addition, a voltage sensor and a current sensor are provided to sense path voltage and path current, respectively, so that an electric connection between the AC utility, the renewable energy generation apparatus, and the load is disconnected to protect the load when an abnormal operation is sensed.

SUMMARY OF THE INVENTION

An object of the invention is to provide a power management apparatus to solve the above-mentioned problems.

The power management apparatus is electrically connected to a renewable energy generation apparatus and a load to form a first path and the power management apparatus is electrically connected to an AC utility and the load to form a second path. The power management apparatus includes a power conversion unit, a first sensing unit, a second sensing unit, a switch unit, and a control unit.

The power conversion unit converts output power generated from the renewable energy generation apparatus to supply the AC utility and the load. The first sensing unit is electrically connected to the first path to sense a first current and a first voltage of the first path. The second sensing unit is electrically connected to the second path to sense a second current and a second voltage of the second path. The switch unit is electrically connected to the second path.

When the control unit turns on the switch unit, the renewable energy generation apparatus is electrically connected in parallel to the AC utility. The control unit acquires an output power generated from the renewable energy generation apparatus according to the first current and the first voltage and acquires a feedback power to the AC utility according to the second current and the second voltage. Also, a power difference between the output power and the feedback power is provided to supply the load.

Another object of the invention is to provide a method of operating a power management apparatus to solve the above-mentioned problems.

The method of operating a power management apparatus, the power management apparatus is electrically connected to a renewable energy generation apparatus and a load to form a first path and the power management apparatus is electrically connected to an AC utility and the load to form a second path. Steps of the method include: (a) a power conversion unit is provided to convert an output power generated from the renewable energy generation apparatus to supply the AC utility and the load. (b) a first sensing unit and a second sensing unit are provided to sense a first current and a first voltage of the first path and a second current and a second voltage of the second path, respectively. (c) a switch unit and a control unit are provided. (d) when the control unit turns on the switch unit, the renewable energy generation apparatus is electrically connected in parallel to the AC utility; the control unit acquires an output power generated from the renewable energy generation apparatus according to the first current and the first voltage and acquires a feedback power to the AC utility according to the second current and the second voltage; and a power difference between the output power and the feedback power is provided to supply the load. (e) when the control unit turns off the switch unit, the renewable energy generation apparatus supplies power to the load in a stand-alone operation.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
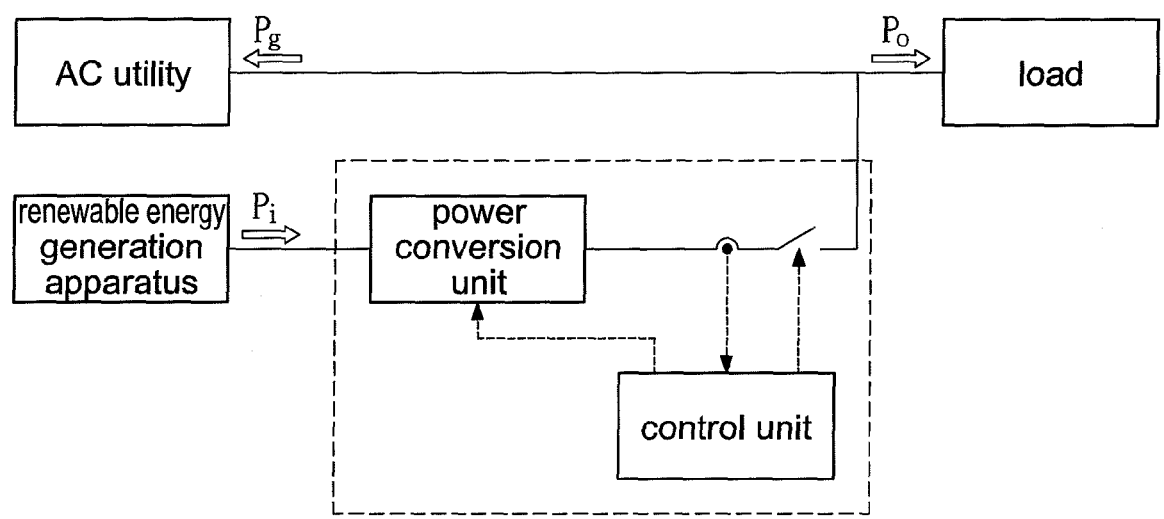
FIG. 1 is a schematic diagram of a prior art renewable energy generation system.

Reference will now be made to the drawing figures to describe the present invention in detail.

Figure 2:
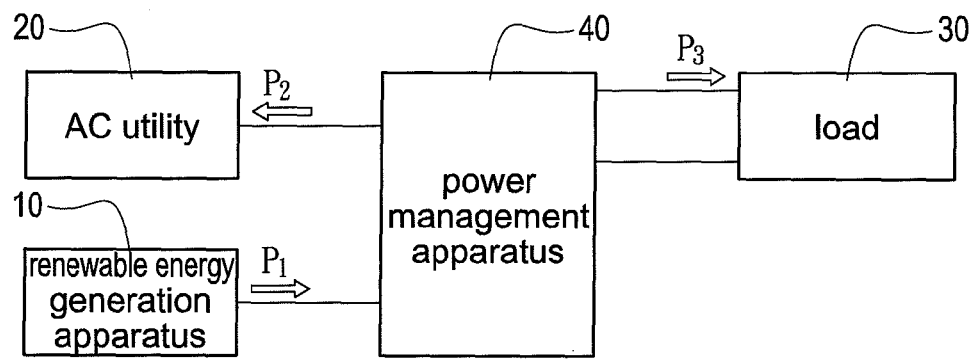
FIG. 2 is a schematic diagram of showing power flow of a renewable energy generation according to the present invention.

Reference is made to FIG. 2 which is a schematic diagram of showing power flow of a renewable energy generation according to the present invention. The renewable energy generation apparatus 10 can be a solar photovoltaic generation apparatus, a fuel cell generation apparatus, a wind power generation apparatus, and so on, but not limited. We assume that a first power P1 is generated from the renewable energy generation apparatus 10, a second power P2 is fed back to the AC utility 20, and a third power P3 is received by the load 30, without considering power losses of the system during operation thereof. Also, a relationship among the three is:

$$P1=P2+P3;$$

Namely, $P2=P1-P3;$

In which, the arrow direction indicates the direction of real power of the instantaneous electric power. That is, the positive sign indicates the direction of real power is the same as the arrow direction, and vice versa.

Hence, a brief discussion between the first power P1, the second power P2, and the third power P3 is described as follows:

(1) The second power P2 is negative (P2=P1−P3) when the third power P3 is greater than the first power P1. This indicates that the renewable energy generation apparatus 10 and the AC utility 20 both provide real power to the load 30. That is, when the required power of the load 30 is greater than the first power P1 generated from the renewable energy generation apparatus 10, the insufficient power of the load 30 is supplied from the AC utility 20, thus maintaining the load 30 to normal operation.

(2) The second power P2 is positive (P2=P1−P3) when the third power P3 is less than the first power P1. This indicates that the renewable energy generation apparatus 10 provide real power to the AC utility 20 and the load 30. That is, when the first power P1 generated from the renewable energy generation apparatus 10 is greater than the required power of the load 30, the redundant power is fed back to the AC utility 20 after the first power P1 is supplied to the load 30.

The above-mentioned real power of the instantaneous electric power is controlled by a power management apparatus 40 and the control operation is described in the later words.

Figure 3:
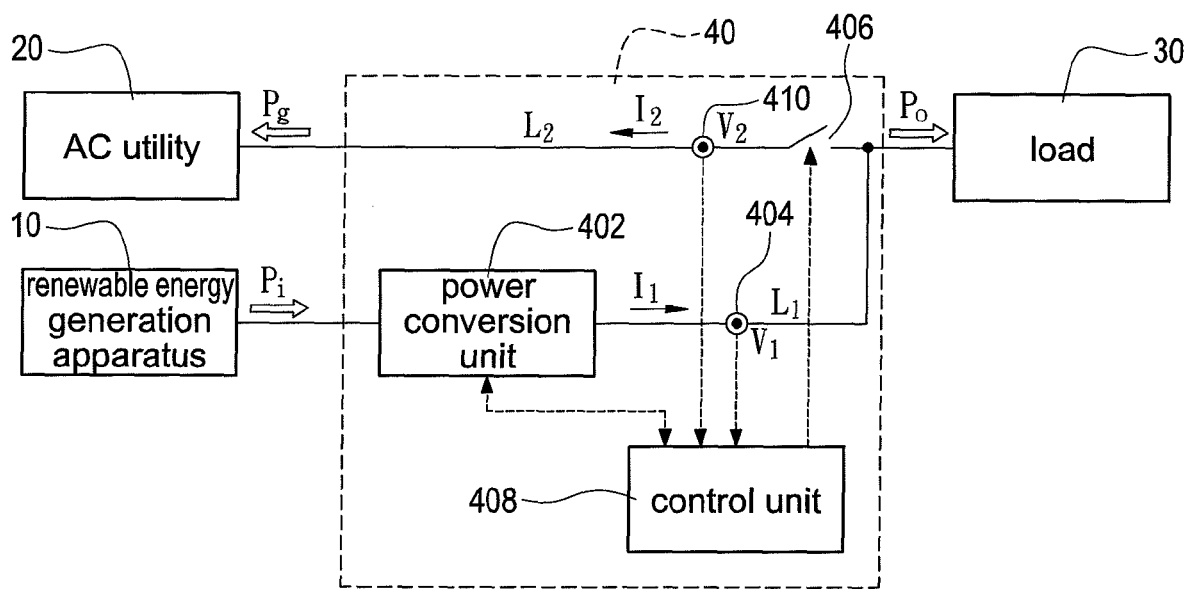
FIG. 3 is a schematic diagram of a power management apparatus according to a first embodiment of the present invention.

Reference is made to FIG. 3 which is a schematic diagram of a power management apparatus according to a first embodiment of the present invention. The power management apparatus 40 is electrically connected to a renewable energy generation apparatus 10, an AC utility 20, and a load 30, respectively. The renewable energy generation apparatus 10 is electrically connected to the load 30 to form a first path L1 and the AC utility 20 is electrically connected to the load 30 to form a second path L2. The power management apparatus 40 includes a power conversion unit 402, a first sensing unit 404, a second sensing unit 410, a switch unit 406, and a control unit 408.

The power conversion unit 402 is electrically connected to the renewable energy generation apparatus 10 to convert an output power generated from the renewable energy generation apparatus 10 to the AC utility 20 and the load 30. That is, the power conversion unit 402 is a DC-to-AC converter when the renewable energy generation apparatus 10 is a DC generation apparatus, such as a solar photovoltaic generation apparatus or a fuel cell generation apparatus, but not limited. On the other hand, when the renewable energy generation apparatus 10 is an AC generation apparatus, such as a wind power generation apparatus, but not limited, the power conversion unit 402 is an AC-to-AC converter.

The first sensing unit 404 is electrically connected to the first path L1 for sensing a first current I1 and a first voltage V1 of the first path L1. The second sensing unit 410 is electrically connected to the second path L2 for sensing a second current I2 and a second voltage V2 of the second path L2. Wherein the first sensing unit 404 is a sensor with both current-sensing and voltage-sensing functions and the second sensing unit 410 is a sensor with both current-sensing and voltage-sensing functions. The switch unit 406 is electrically connected to the second path L2. The control unit 408 is electrically connected to the power conversion unit 402, the first sensing unit 404, the second sensing unit 410, and the switch unit 406.

Figure 4A:
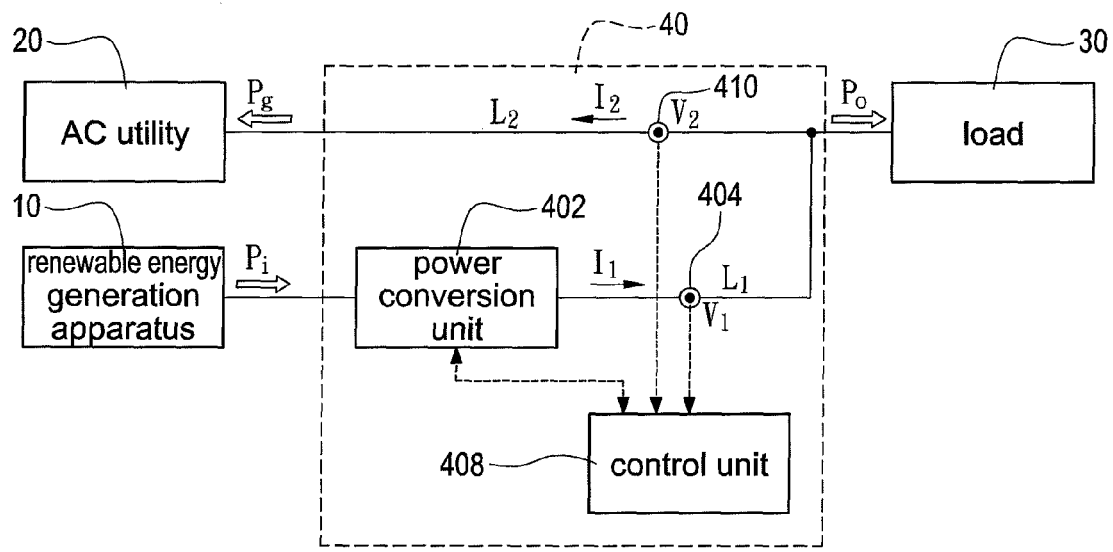
FIG. 4A is a schematic diagram of turning on a switch unit of the power management apparatus according to the present invention.

Reference is made to FIG. 4A which is a schematic diagram of turning on a switch unit of the power management apparatus according to the present invention. When the control unit 408 turns on the switch unit 406, the renewable energy generation apparatus 10 is electrically connected in parallel to the AC utility 20, thus forming a grid-connection generation structure. The control unit 408 acquires an output power generated from the renewable energy generation apparatus 10 according to the sensed first current I1 and first voltage V1. That is, without considering power losses of the system during operation thereof, a product of the first current I1 and the first voltage V1 (namely, I1*V1) is equal to the output power of the renewable energy generation apparatus 10. In addition, the control unit 408 acquires a power feeding back to the AC utility 20 according to the sensed second current I2 and second voltage V2. That is, without considering power losses of the system during operation thereof, a product of the second current I2 and the second voltage V2 (namely, I2*V2) is equal to the power feeding back to the AC utility 20. In addition, a power difference between the output power generated from the renewable energy generation apparatus 10 and the feedback power to the AC utility 20 is provided to supply the load 30.

Furthermore, the control unit 408 turns off the switch unit 406 to disconnect the AC utility 20 from the power management apparatus 40 while the renewable energy generation apparatus 10 and the load 30 are still connected through the power management apparatus 40 when an abnormal voltage of the second voltage V2 is sensed by the second sensing unit 410. Accordingly, a protection operation is provided by turning off the switch unit 406. That is, an electric connection between the AC utility 20 and the load 30 is disconnected to protect the load 30 when the AC utility 20 is abnormal, thus providing high availability and quality of supplying power to the load 30.

In practical applications, the output power generated from the renewable energy generation apparatus 10 according to the first current I1 and the first voltage V1 and the feedback power to the AC utility 20 according to the second current I2 and the second voltage V2 can be further smartly managed. In particular, the output power of the renewable energy generation apparatus 10 is determined according to ambient conditions. Take the solar photovoltaic generation system as an example, the output power of the renewable energy generation apparatus 10 is determined based on seasons, day and night, sunlight time, sunlight intensity, and so on. In addition, take the wind power generation system as an example, the output power of the renewable energy generation apparatus 10 is determined based on seasons, day and night, wind speed, and so on. In brief, because the output power of the renewable energy generation apparatus 10 would continuously vary, the best energy management strategy is that the output power generated from the renewable energy generation apparatus 10 would be completely provided to the load 30 according to considerations of costs and efficiency of supplying power and feeding power of the power generation system. Further, the time of operating the load 30 can be shifted from the peak time to the off-peak time, thus increasing efficiency of power supply as well as significantly reducing the electricity bill. Accordingly, the feedback power to the AC utility 20 can be controlled to meet demand for electricity of the load 30, thus achieving a smart power management.

Figure 4B:
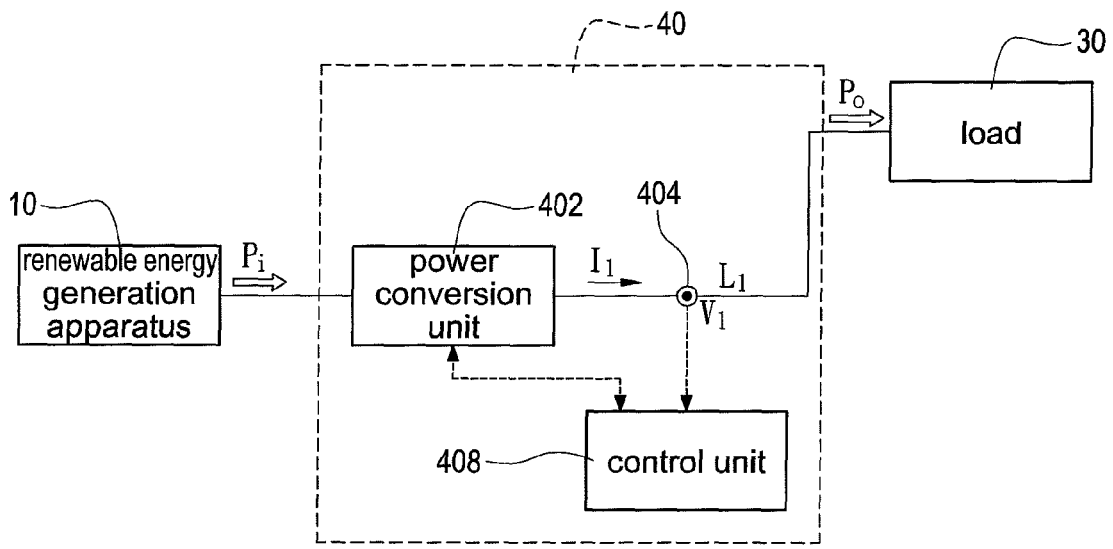
FIG. 4B is a schematic diagram of turning off the switch unit of the power management apparatus according to the present invention.

Reference is made to FIG. 4B which is a schematic diagram of turning off the switch unit of the power management apparatus according to the present invention. The renewable energy generation apparatus 10 supplies power to the load 30 in a stand-alone operation when the control unit 408 turns off the switch unit 406. That is, the stand-alone generation structure is developed to achieve self-sufficient power supply by supplying the required power to the load 30 from the renewable energy generation apparatus 10.

Especially to deserve to be mentioned, the connection locations of the first sensing unit 404 and the second sensing unit 410 are not limited. Therefore, all such substitutions and modifications of installation locations of the sensing units, which can determine the using power of the load 30 and the feeding power of the AC utility 20, are intended to be embraced within the scope of the invention as defined in the appended claims.

Figure 5:
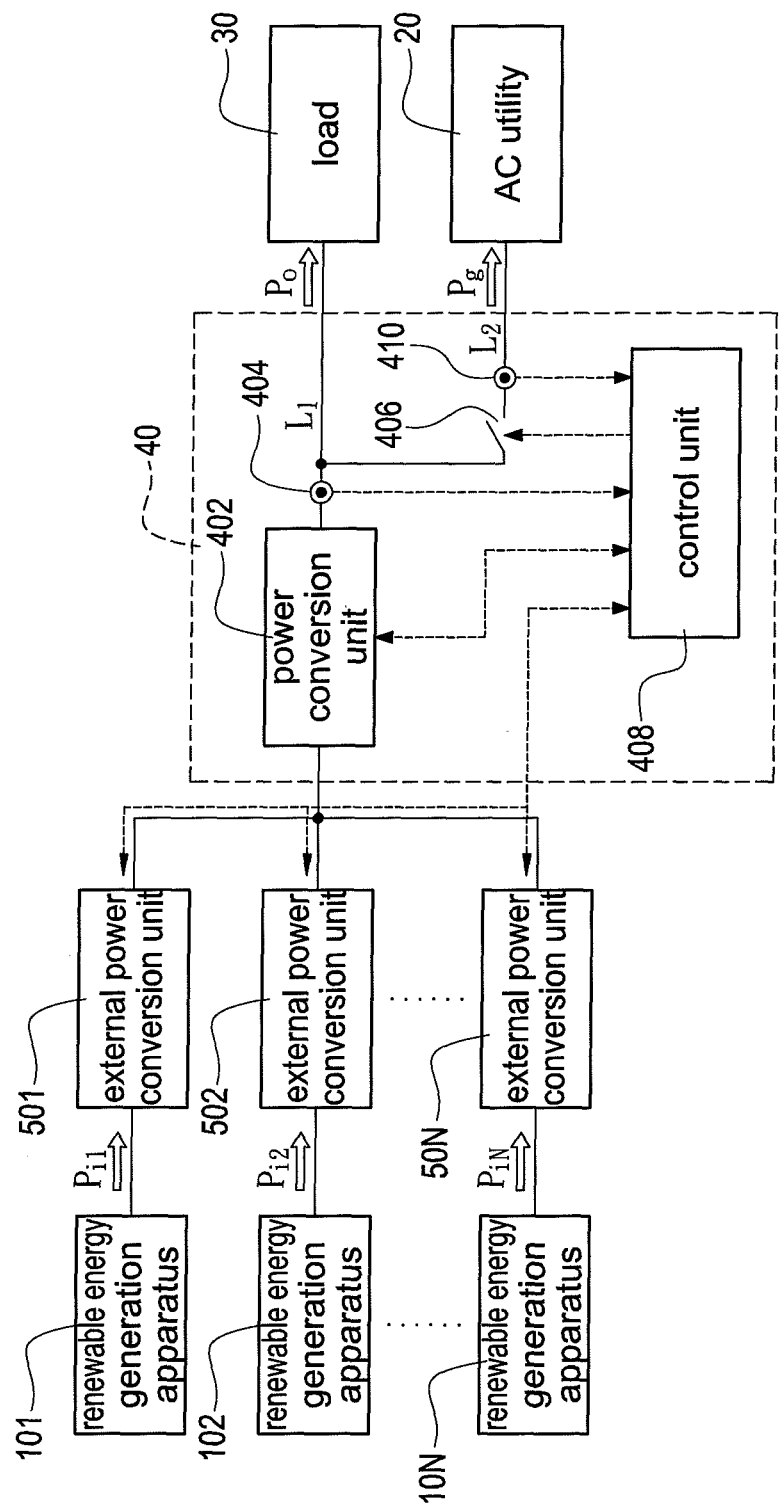
FIG. 5 is a schematic diagram of a power management apparatus according to a second embodiment of the present invention.

Reference is made to FIG. 5 which is a schematic diagram of a power management apparatus according to a second embodiment of the present invention. The largest difference between the first embodiment and the second embodiment is that the latter has a plurality of renewable energy generation apparatuses 101~10N to form a multi-input generation structure. In particular, the renewable energy generation apparatuses 101~10N are electrically connected in parallel to each other. Also, each of the renewable energy generation apparatuses 101~10N is further electrically connected in series to an external power conversion unit 501~50N and then electrically connected in series to the power management apparatus 40. Further, each of the external power conversion units 501~50N is controlled by the control unit 408 to convert the output power generated from the corresponding renewable energy generation apparatuses 101~10N according to conditions of the load 30 and the renewable energy generation apparatuses 101~10N. Accordingly, the multi-input generation structure would increase margin of power generation and stability and reliability of the generation system. In this example, a combination of a solar photovoltaic generation apparatus and a wind power generation apparatus is exemplified for further demonstration. The solar photovoltaic generation apparatus could normally provide greater output power in the summer and daytime; on the other hand, the wind power generation apparatus could normally provide greater output power in the winter and night. Accordingly, the solar photovoltaic generation apparatus and the wind power generation apparatus can be combined and integrated to implement power coordination and planning, thus increasing stability and reliability of the generation system.

Figure 6:
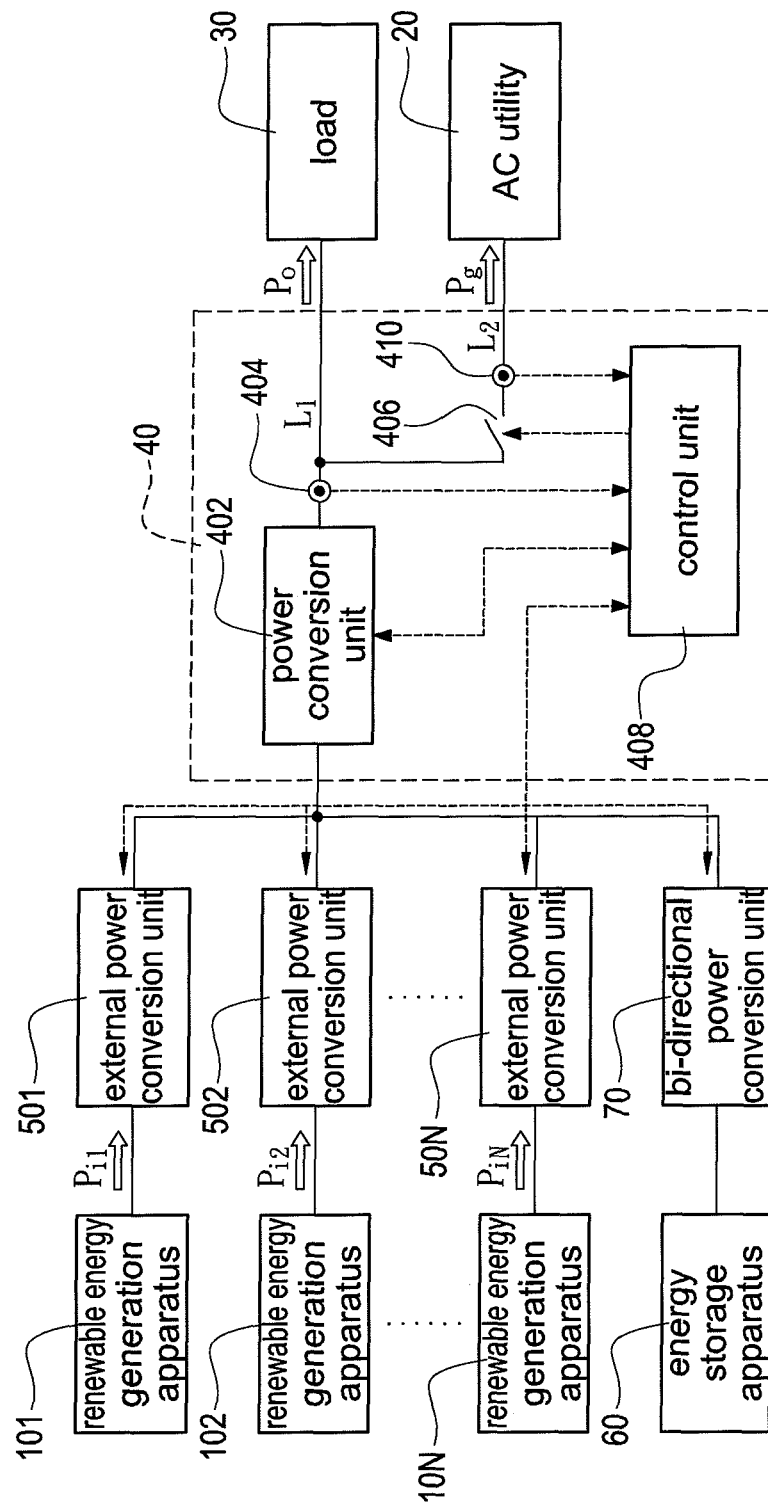
FIG. 6 is a schematic diagram of a power management apparatus according to a third embodiment of the present invention.

Reference is made to FIG. 6 which is a schematic diagram of a power management apparatus according to a third embodiment of the present invention. The largest difference between the second embodiment and the third embodiment is that the latter further includes an energy storage apparatus 60 for storing redundant power generated from the renewable energy generation apparatuses 101~10N. Also, the energy storage apparatus 60 is further electrically connected in series to a bi-directional power conversion unit 70. When the redundant power is generated from the renewable energy generation apparatuses 101~10N, the redundant power is stored in the energy storage apparatus 60 via the bi-directional power conversion unit 70. On the other hand, when the renewable energy generation apparatuses 101~10N provide insufficient electric power, the energy storage apparatus 60 outputs the stored energy thereof to the load 30 via the bi-directional power conversion unit 70.

Figure 7:
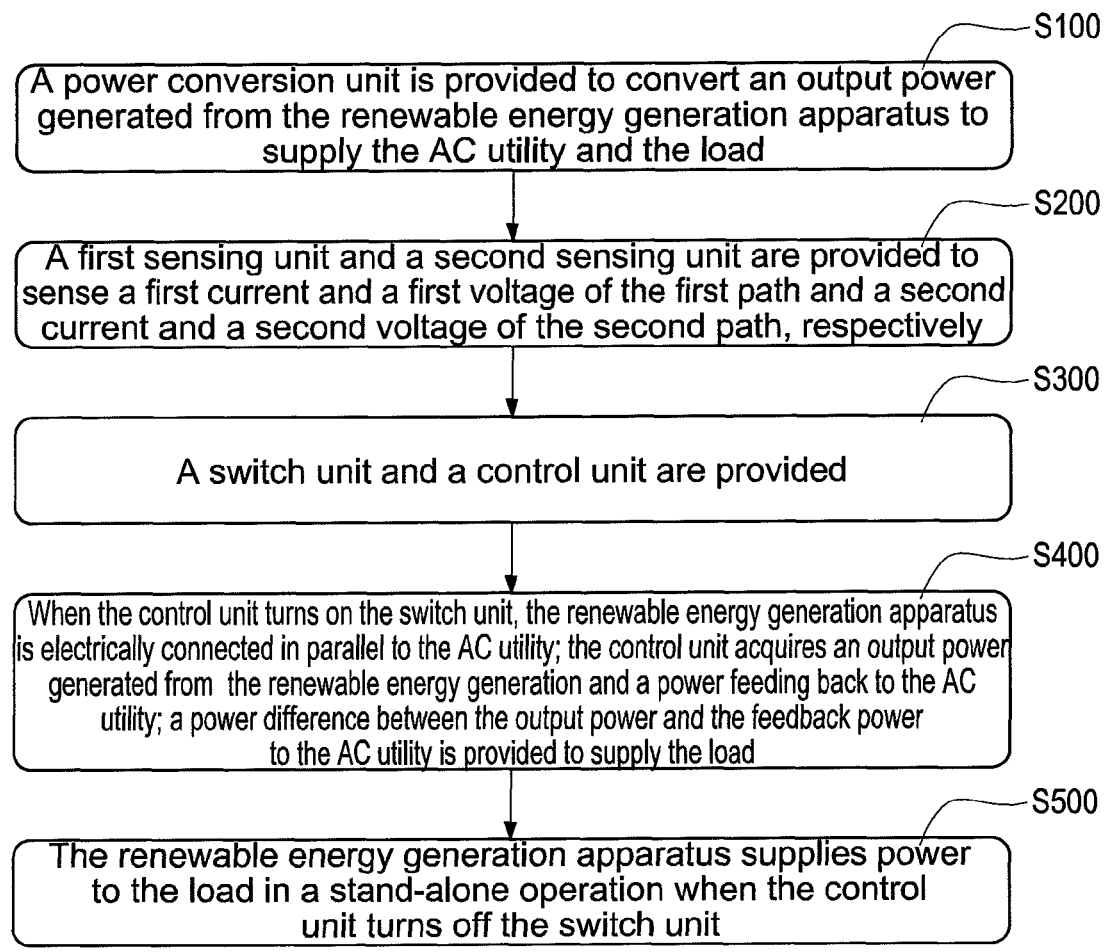
FIG. 7 is a flowchart of operating the power management apparatus according to the present invention.

Reference is made to FIG. 7 which is a flowchart of operating the power management apparatus according to the present invention. The power management apparatus is electrically connected to a renewable energy generation apparatus and a load to form a first path and the power management apparatus is electrically connected to an AC utility and the load to form a second path. The method includes following steps:

A power conversion unit is provided to convert an output power generated from the renewable energy generation apparatus to supply the AC utility and the load (S100). The power conversion unit is electrically connected to the renewable energy generation apparatus to convert the output of the renewable energy generation apparatus into AC output. That is, the power conversion unit is a DC-to-AC converter when the renewable energy generation apparatus is a DC generation apparatus, such as a solar photovoltaic generation apparatus or a fuel cell generation apparatus, but not limited. Further, the power conversion unit is an AC-to-AC converter when the renewable energy generation apparatus is an AC generation apparatus, such a wind power generation apparatus, but not limited.

A first sensing unit and a second sensing unit are provided (S200). The first sensing unit is electrically connected to the first path to sense a first current and a first voltage of the first path. The second sensing unit is electrically connected to the second path to sense a second current and a second voltage of the second path.

A switch unit and a control unit are provided (S300). The switch unit is electrically connected to the second path. The control unit is electrically connected to the power conversion unit, the first sensing unit, the second sensing unit, and the switch unit.

When the control unit turns on the switch unit, the renewable energy generation apparatus is electrically connected in parallel to the AC utility, thus forming a grid-connection generation structure. The control unit acquires an output power generated from the renewable energy generation apparatus according to the sensed first current and first voltage. Also, the control unit acquires a power feeding back to the AC utility according to the sensed second current and second voltage. In addition, a power difference between the output power generated from the renewable energy generation apparatus and the feedback power to the AC utility is provided to supply the load (S400).

The renewable energy generation apparatus supplies power to the load in a stand-alone operation when the control unit turns off the switch unit (S500). That is, the stand-alone generation structure is developed to achieve self-sufficient power supply by supplying the required power to the load from the renewable energy generation apparatus.

When an amount of the renewable energy generation apparatus is plural, the renewable energy generation apparatuses are electrically connected in parallel to each other. In particular, each of the renewable energy generation apparatuses is further electrically connected in series to an external power conversion unit and then electrically connected in series to the power management apparatus. Further, each of the external power conversion units is controlled by the control unit to convert the output power generated from the corresponding renewable energy generation apparatus so as to electrically connect the renewable energy generation apparatuses in parallel.

In addition, an energy storage apparatus is provided to store redundant power generated from the renewable energy generation apparatus. Also, the energy storage apparatus further electrically connected in series to a bi-directional power conversion unit. When the redundant power is generated from the renewable energy generation apparatuses, the redundant power is stored in the energy storage apparatus via the bi-directional power conversion unit. On the other hand, the energy storage apparatus outputs the stored energy thereof to the load via the bi-directional power conversion unit when the renewable energy generation apparatuses provide insufficient electric power.

In conclusion, the present invention has following advantages:

1. The switch unit 406 can be provided to switch the renewable energy generation apparatus in a grid-connection operation or a stand-alone operation;

2. The output power generated from the renewable energy generation apparatus 10 according to the first current I1 and the first voltage V1 and the feedback power to the AC utility 20 according to the second current I2 and the second voltage V2 can be further smartly managed through the first sensing unit 404 and the second sensing unit 410, respectively;

3. An electric connection between the AC utility 20 and the load 30 is disconnected by turning off the switch unit 406 by the control unit 408 when the AC utility 20 is abnormal, which is sensed by the second sensing unit 410, thus providing a protection operation and providing high availability and quality of supplying power of the load 30;

4. A multi-input generation structure is formed by installing a plurality of renewable energy generation apparatuses 101~10N in parallel, thus increasing margin of power generation and stability and reliability of the generation system; and 5. The energy storage apparatus 60 is provided to store redundant power generated from the renewable energy generation apparatuses 101~10N, thus increasing elasticity of the renewable energy generation.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power management apparatus electrically connected to a renewable energy generation apparatus and a load to form a first path and the power management apparatus electrically connected to an AC utility and the load to form a second path; the power management apparatus comprising:
   a power conversion unit converting an output power generated from the renewable energy generation apparatus to supply the AC utility and the load;
   a first sensing unit electrically connected to the first path to sense a first current and a first voltage of the first path;
   a second sensing unit electrically connected to the second path to sense a second current and a second voltage of the second path;
   a switch unit electrically connected to the second path; and
   a control unit;
   when the control unit turns on the switch unit, the renewable energy generation apparatus is electrically connected in parallel to the AC utility; the control unit acquires an output power generated from the renewable energy generation apparatus according to the first current and the first voltage and acquires a feedback power to the AC utility according to the second current and the second voltage; and a power difference between the output power and the feedback power is provided to supply the load.

2. The power management apparatus of claim 1, wherein the control unit is electrically connected to the power conversion unit, the first sensing unit, the second sensing unit, and the switch unit; the renewable energy generation apparatus supplies power to the load in a stand-alone operation when the control unit turns off the switch unit.

3. The power management apparatus of claim 1, wherein the control unit turns off the switch unit to disconnect the AC utility from the power management apparatus while the renewable energy generation apparatus and the load are still connected through the power management apparatus when an abnormal second voltage is sensed by the second sensing unit.

4. The power management apparatus of claim 1, wherein the first sensing unit is a sensor with both current-sensing and voltage-sensing functions and the second sensing unit is a sensor with both current-sensing and voltage-sensing functions; the output power generated from the renewable energy generation apparatus is equal to a product of the first current and the first voltage sensed by the first sensing unit and the power feeding back to the AC utility is equal to a product of the second current and the second voltage sensed by the second sensing unit.

5. The power management apparatus of claim 1, wherein when an amount of the renewable energy generation apparatus is plural, each of the renewable energy generation apparatuses is electrically connected in parallel to each other.

6. The power management apparatus of claim 5, wherein each of the renewable energy generation apparatuses is further electrically connected in series to an external power conversion unit and then electrically connected in series to the power management apparatus; each of the external power conversion units is controlled by the control unit to convert the output power generated from the corresponding renewable energy generation apparatuses so as to electrically connect the renewable energy generation apparatuses in parallel.

7. The power management apparatus of claim 5, wherein the power management apparatus is further electrically connected in series to an energy storage apparatus via a bi-directional power conversion unit to store redundant power generated from the renewable energy generation apparatuses.

8. The power management apparatus of claim 7, wherein the renewable energy generation apparatuses output redundant power to store in the energy storage apparatus via the bi-directional power conversion unit; the energy storage apparatus outputs the stored energy thereof to the load via the bi-directional power conversion unit when the renewable energy generation apparatuses provide insufficient electric power.

9. The power management apparatus of claim 1, wherein the power conversion unit is a DC-to-AC converter when the renewable energy generation apparatus is a DC generation apparatus; the power conversion unit is an AC-to-AC converter when the renewable energy generation apparatus is an AC generation apparatus.

10. The power management apparatus of claim 9, wherein the DC generation apparatus is a solar photovoltaic generation apparatus or a fuel cell generation apparatus.

11. The power management apparatus of claim 9, wherein the AC generation apparatus is a wind power generation apparatus.

12. A method of operating a power management apparatus, the power management apparatus electrically connected to a renewable energy generation apparatus and a load to form a first path and the power management apparatus electrically connected to an AC utility and the load to form a second path; steps of the method comprising:
(a) providing a power conversion unit to convert an output power generated from the renewable energy generation apparatus to supply the AC utility and the load;
(b) providing a first sensing unit and a second sensing unit to sense a first current and a first voltage of the first path and a second current and a second voltage of the second path, respectively;
(c) providing a switch unit and a control unit;
(d) electrically connecting the renewable energy generation apparatus in parallel to the AC utility when the control unit turns on the switch unit; the control unit acquires an output power generated from the renewable energy generation apparatus according to the first current and the first voltage and acquires a feedback power to the AC utility according to the second current and the second voltage; and a power difference between the output power and the feedback power is provided to supply the load; and
(e) supplying power to the load by the renewable energy generation apparatus in a stand-alone operation when the control unit turns off the switch unit.

13. The method of operating the power management apparatus of claim 12, in the step (b) further comprising:
turning off the switch unit by the control unit to disconnect the AC utility from the power management apparatus while the renewable energy generation apparatus and the load are still connected through the power management apparatus when an abnormal second voltage is sensed by the second sensing unit.

14. The method of operating the power management apparatus of claim 12, in the step (b) wherein the first sensing unit is a sensor with both current-sensing and voltage-sensing functions and the second sensing unit is a sensor with both current-sensing and voltage-sensing functions; the output power generated from the renewable energy generation apparatus is equal to a product of the first current and the first voltage sensed by the first sensing unit and the power feeding back to the AC utility is equal to a product of the second current and the second voltage sensed by the second sensing unit.

15. The method of operating the power management apparatus of claim 12, wherein when an amount of the renewable energy generation apparatus is plural, each of the renewable energy generation apparatuses is electrically connected in parallel to each other.

16. The method of operating the power management apparatus of claim 15, wherein each of the renewable energy generation apparatuses is further electrically connected in series to an external power conversion unit and then electrically connected in series to the power management apparatus; each of the external power conversion units is controlled by the control unit to convert the output power generated from the corresponding renewable energy generation apparatuses so as to electrically connect the renewable energy generation apparatuses in parallel.

17. The method of operating the power management apparatus of claim 12, further comprising:
(f) providing an energy storage apparatus to store redundant power generated from the renewable energy generation apparatuses.

18. The method of operating the power management apparatus of claim 17, in the step (f) wherein the energy storage apparatus is further electrically connected in series to a bi-directional power conversion unit; the redundant power is stored in the energy storage apparatus via the bi-directional power conversion unit when the redundant power are generated from the renewable energy generation apparatuses; the energy storage apparatus outputs the stored energy thereof to the load via the bi-directional power conversion unit when the renewable energy generation apparatuses provide insufficient electric power.

19. The method of operating the power management apparatus of claim 12, wherein the power conversion unit is a DC-to-AC converter when the renewable energy generation apparatus is a DC generation apparatus; the power conversion unit is an AC-to-AC converter when the renewable energy generation apparatus is an AC generation apparatus.

20. The method of operating the power management apparatus of claim 19, wherein the DC generation apparatus is a solar photovoltaic generation apparatus or a fuel cell generation apparatus; the AC generation apparatus is a wind power generation apparatus.

* * * * *